United States Patent
Hirano et al.

(10) Patent No.: US 8,920,963 B2
(45) Date of Patent: Dec. 30, 2014

(54) PORTABLE DEVICE

(75) Inventors: Takayuki Hirano, Aichi (JP); Hiroyuki Sugiyama, Aichi (JP); Takeshi Murakami, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 745 days.

(21) Appl. No.: 13/175,371

(22) Filed: Jul. 1, 2011

(65) Prior Publication Data

US 2012/0009454 A1    Jan. 12, 2012

(30) Foreign Application Priority Data

Jul. 8, 2010   (JP) ................................. 2010-156059

(51) Int. Cl.
| | | |
|---|---|---|
| H01M 2/08 | (2006.01) | |
| H01M 2/10 | (2006.01) | |
| H01R 3/00 | (2006.01) | |
| G07C 9/00 | (2006.01) | |
| H01H 9/02 | (2006.01) | |

(52) U.S. Cl.
CPC ......... *G07C 9/00944* (2013.01); *H01H 9/0235* (2013.01); *H01M 2/1044* (2013.01)
USPC .............. 429/174; 429/96; 429/185; 439/500

(58) Field of Classification Search
USPC ............................ 429/185, 96, 174; 439/500
See application file for complete search history.

(56) References Cited

U.S. PATENT DOCUMENTS

| | | |
|---|---|---|
| 6,218,044 B1 | 4/2001 | Suzuka |
| 7,981,535 B2 * | 7/2011 | Scott et al. .................... 429/100 |
| 2004/0018337 A1 | 1/2004 | Hus |
| 2007/0145056 A1 | 6/2007 | Enomoto |
| 2009/0084753 A1 | 4/2009 | Ramos |

FOREIGN PATENT DOCUMENTS

| | | |
|---|---|---|
| EP | 1850039 A1 | 10/2007 |
| JP | 61-064414 | 4/1986 |
| JP | 5-35980 | 5/1993 |
| JP | 11-189268 | 7/1999 |
| JP | 2000-055201 | 2/2000 |
| JP | 2004-197882 | 7/2004 |
| JP | 2009-155894 | 7/2009 |
| JP | 4460622 B1 | 5/2010 |
| JP | 2010-182603 | 8/2010 |
| WO | 2007/027256 A1 | 3/2007 |

OTHER PUBLICATIONS

Search Report dated Apr. 3, 2012 from European Patent Application No. EP 11172207.0 (8 pages).

\* cited by examiner

*Primary Examiner* — Patrick Ryan
*Assistant Examiner* — Julian Anthony
(74) *Attorney, Agent, or Firm* — James R. Gourley; Carstens & Cahoon, LLP (57) ABSTRACT

A portable device, which performs wireless communication with a communication peer, includes a battery, which powers an electronic component, and a case, which accommodates the electronic component and battery. The case includes a battery compartment having an opening. An elastic waterproof seal surrounds the opening. A battery lid, which covers the opening, is formed integrally with the waterproof seal and coupled to the case in a direction perpendicular to a radial direction of the waterproof seal. A rim around the opening of the battery compartment pushes the waterproof seal when coupling the battery lid to the case thereby elastically deforming the waterproof seal in an inward radial direction. The waterproof seal, when elastically deformed, keeps the battery lid coupled to the case and seals the battery lid and case in a liquid-tight state.

12 Claims, 6 Drawing Sheets

PORTABLE DEVICE

CROSS-REFERENCE TO RELATED APPLICATIONS

This application is based upon and claims the benefit of priority from prior Japanese Patent Application No. 2010-156059, filed on Jul. 8, 2010, the entire contents of which are incorporated herein by reference.

BACKGROUND OF THE INVENTION

The present invention relates to a portable device powered by a replaceable battery to perform predetermined wireless communication with a certain communication peer.

A known electronic key system includes a portable device and a predetermined communication peer. The portable device is carried by an owner (user) of a vehicle, house, or the like. The communication peer is arranged in the vehicle, house, or the like. Wireless communication is performed between the portable device and communication peer to lock and unlock the vehicle, house, or the like. The portable device includes a replaceable battery and is powered by the battery when performing wireless communication with the communication peer.

Japanese Laid-Open Utility Model Publication No. 5-35980 discloses a waterproof portable device, which prevents the battery from being short-circuited by a liquid such as water. The portable device includes a case, which includes a battery compartment, and a battery lid, which covers the battery compartment. An O-ring is arranged between the case and the battery lid. The O-ring, which is compressed by fastening the battery lid to the case with a screw, prevents liquid from entering the battery compartment.

SUMMARY OF THE INVENTION

In the portable device of the above publication, the compression of the O-ring produce a repulsive force that urges the case and battery lid away from each other. Thus, to keep the O-ring compressed so that the portable device remains waterproof, the case and battery lid must be fastened together with the screw. However, this results in the case and battery lid requiring a fastening structure for the screw.

It is an object of the present invention to provide a portable device including a simple waterproof structure.

One aspect of the present invention is a portable device including an electronic component that performs predetermined wireless communication with a certain communication peer. A battery powers the electronic component. A case accommodates the electronic component and the battery. The case includes a case body having a battery compartment that accommodates the battery. The battery compartment includes an opening formed in one side of the case body. A battery lid covers the opening of the battery compartment. An elastic waterproof seal is formed integrally with the battery lid and surrounds the opening of the battery compartment. The battery lid is coupled to the case body in a direction perpendicular to a radial direction of the waterproof seal. A rim is formed around the opening of the battery compartment and pushes the waterproof seal and elastically deforms the waterproof seal in an inward radial direction when the battery lid is coupled to the case body. The waterproof seal produces an elastic repulsive force when elastically deformed, and the elastic repulsive force pushes outwardly against an inner wall of the battery compartment to keep the battery lid in a state coupled to the case body and to seal a gap between the battery lid and the case body in a liquid-tight state.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

Figure 1:
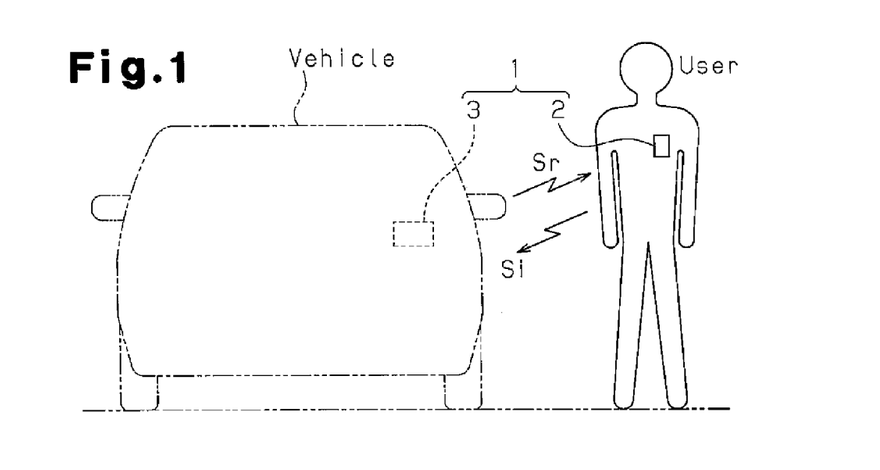
FIG. 1 is a schematic diagram showing an electronic key system for a vehicle according to the present invention.

An electronic key 2 according to one embodiment of the present invention will now be described. As shown in FIG. 1, an electronic key system 1, which locks and unlocks a door of a vehicle, includes an electronic key 2, which serves as a portable device, and a lock controller 3, which serves as a communication peer installed in the vehicle. The lock controller 3 intermittently transmits a request signal Sr at a controlled timing to a limited communication area, which is formed around the vehicle. The request signal Sr requests the electronic key 2 to transmit an ID code. When receiving the request signal Sr, the electronic key 2 transmits an ID signal Si, which contains an ID code recorded beforehand in its memory. When receiving the ID signal Si from the electronic key 2, the lock controller 3 verifies the ID code contained in the ID signal Si with an ID code stored beforehand in its memory. When the two ID codes are the same, the lock controller 3 unlocks the door. When the user moves away from the vehicle and out of the communication area while carrying the electronic key 2, the lock controller 3 can no longer receive the ID signal Si transmitted from the electronic key 2. In such a case, the lock controller locks the vehicle door. In this manner, the electronic key system 1 locks and unlocks the door without the user touching the vehicle.

The structure of the electronic key 2 will now be discussed with reference to FIG. 2. The electronic key 2 includes a case body 6, a battery lid 7, and a cover 8. The case body 6 accommodates an electronic component 5 that performs wireless communication with the lock controller 3. The battery lid 7 is attached to the case body 6 in a removable manner. The cover 8, which is attached to the case body 6 in a removable manner, covers the battery lid 7. The cover 8 and the case body 6 form an outer surface, or ornamental surface, of the electronic key 2. The case body 6, battery lid 7, and cover 8 are formed by a synthetic resin material such as polybutylene terephthalate. In this example, the case body 6, the battery lid 7, and the cover 8 are colored in black. The electronic key 2 is box-shaped in its entirety.

The case body 6 includes a receptacle 10, which is adjacent to the electronic component 5. A cylindrical battery compartment 11 is defined in the receptacle 10. The battery compartment 11 includes an open end. The rim of the opening forms an annular step 12. A battery 9, which is a button cell, is accommodated in the battery compartment 11. Two catches 13 are formed at opposite sides on the outer surface of the receptacle 10. In one example, the catches 13 are arranged on the left surface and right surface of the receptacle 10. The battery compartment 11 includes an exposed electrode, which is connected to the electronic component 5. The battery 9 serves as a power supply that supplies the electronic component 5 with power through the electrode. In the illustrated example, one side of the case body 6 includes a stepped surface, which is lower than a top surface of the case body 6. The receptacle 10 is formed on the stepped surface.

Figure 3:
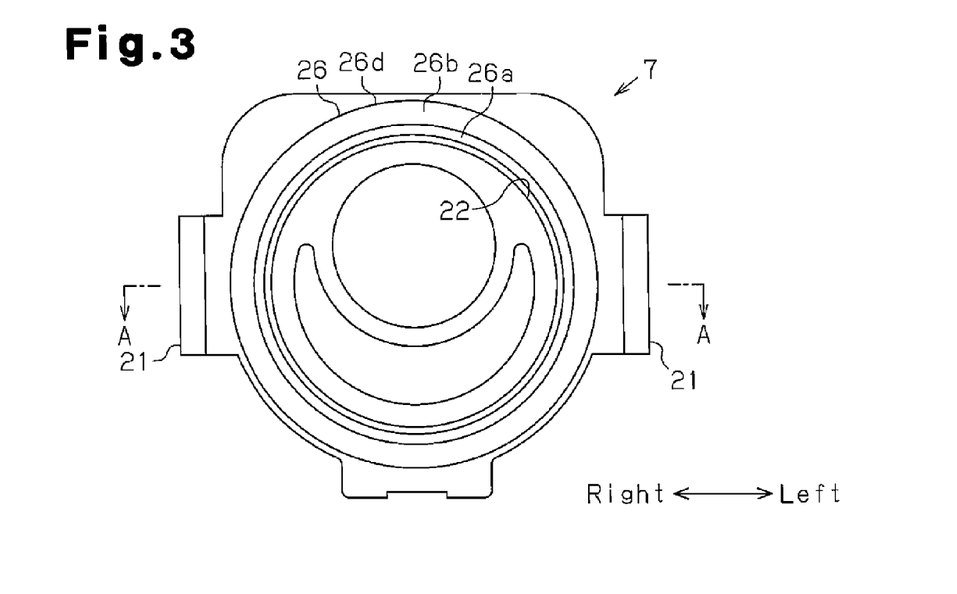
FIG. 3 is a plan view showing a bottom surface of a battery lid in the electronic key of FIG. 2.
Figure 4:
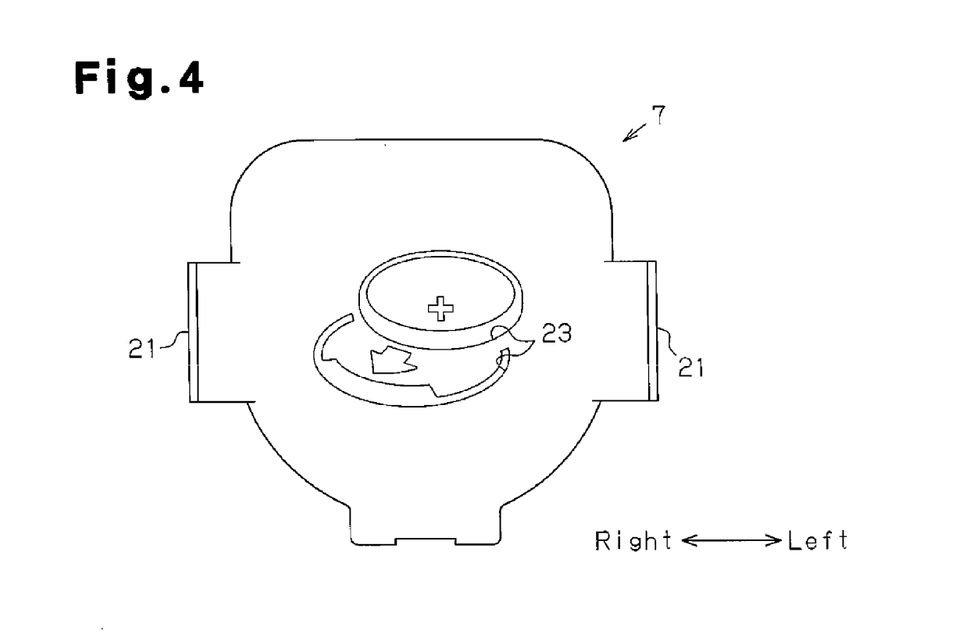
FIG. 4 is a plan view showing a top surface of the battery lid in the electronic key of FIG. 2.
Figure 5:
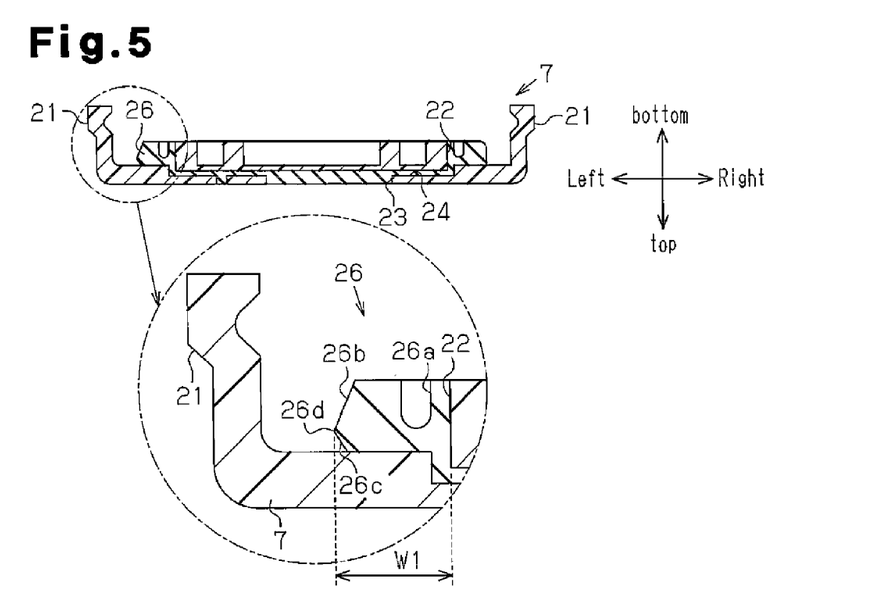
FIG. 5 is a cross-sectional view of the battery lid taken along line A-A in FIG. 3.

As shown in FIG. 3, the battery lid 7 includes two hooks 21. In one example, the hooks 21 are arranged facing toward each other on left and right sides of the battery lid 7. The two hooks 21 extend downward from a bottom surface of the battery lid 7 to respectively engage the catches 13 of the receptacle 10. A disk-shaped waterproof member holder 22 projects from the bottom surface of the battery lid 7. An annular waterproof member 26 is arranged around an outer circumferential surface of the waterproof member holder 22. The waterproof member 26 coheres to the outer circumferential surface of the waterproof member holder 22, which corresponds to the step 12 of the receptacle 10. As shown in FIG. 4, design grooves 23, which depict the battery replacement procedure, are formed in the top surface of the battery lid 7. Referring to FIG. 5, the design grooves 23 are in communication with the bottom surface of the battery lid 7 through communication grooves 24. The waterproof member 26 is formed from colored silicone rubber, which is elastic under normal temperatures. The silicone rubber is colored red, for example. The waterproof member 26 and battery lid 7 are insert-molded and formed integrally with each other. During the insert molding, silicone rubber enters the design grooves 23 and produces an anchoring effect. An illustration formed by the design grooves 23 when filled with silicone rubber is emphasized by the contrast (difference in color or luster) between the battery lid 7 and the silicone rubber. Further, the silicone rubber in the design grooves 23 is exposed from the top surface of the battery lid 7. The exposed silicone rubber functions to prevent slipping when the user holds the battery lid 7.

Figure 6:
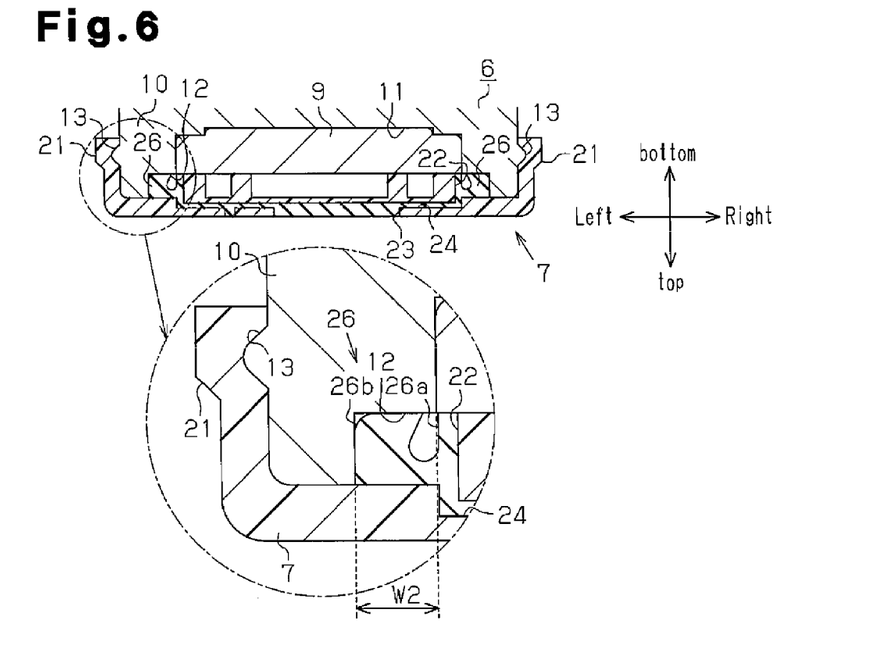
FIG. 6 is a cross-sectional view of the battery lid and a case body in a state coupled to each other.

As shown in the enlarged view of FIG. 5, a flexible groove 26a extends along the entire waterproof member 26 on the surface facing away from the bottom surface of the battery lid 7. A guide surface 26b and inclined surface 26c are formed on the outer circumferential surface of the waterproof member 26. The guide surface 26b and the inclined surface 26c intersect each other at an obtuse angle. The guide surface 26b is formed at the bottom side (upper side as viewed in the drawing) of the waterproof member 26. The inclined surface 26c is formed at the top side (lower side as viewed in the drawing) of the waterproof member 26. The guide surface 26b gradually extends outward toward the lower side of the drawing (toward the inner surface of the battery lid 7). The inclined surface 26c inclines inward toward the lower side of the drawing. The guide surface 26b and the inclined surface 26c form a ridge 26d in between. The ridge 26d extends along the entire outer circumferential surface of the waterproof member 26. When an external force acts to press the guide surface 26b, the waterproof member 26 is elastically deformed inward in the radial direction. The flexible groove 26a facilitates the elastic deformation of the waterproof member 26. The waterproof member 26 has a width W1, which is the distance from the outer circumferential surface of the waterproof member holder 22 to the ridge 26d. The step 12 has a width W2 (refer to FIG. 6). The width W1 is greater than the width W2.

The procedures for coupling the battery lid 7, the cover 8, and the battery 9 to the case body 6 will now be described.

Figure 2:
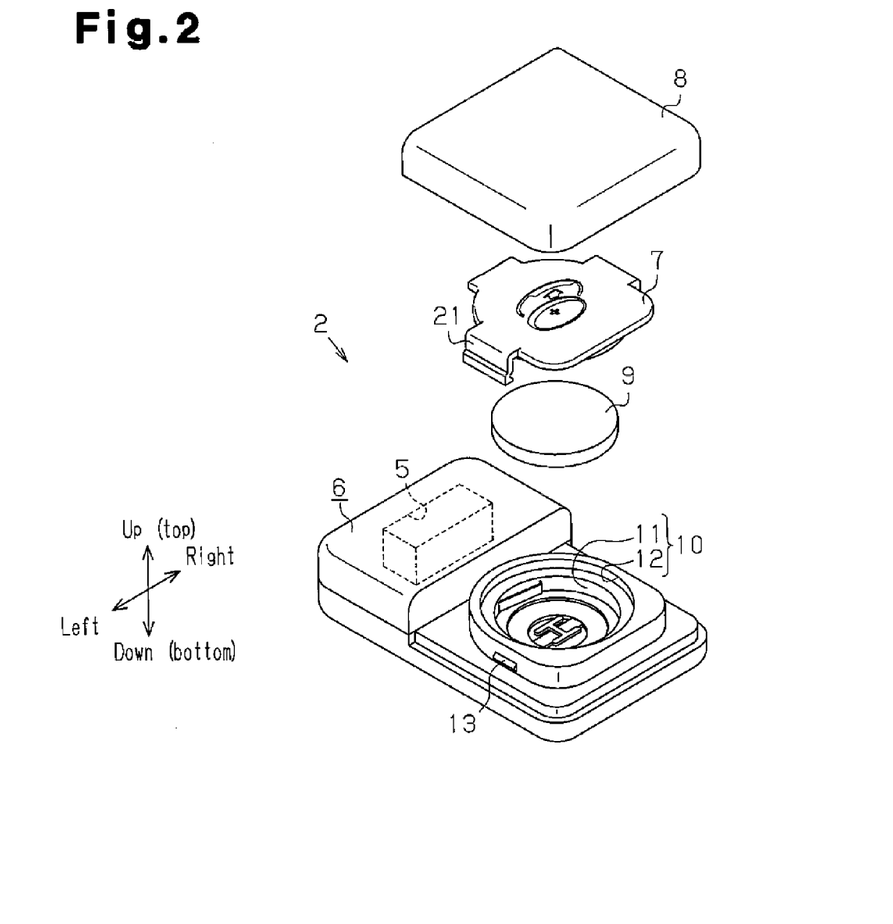
FIG. 2 is an exploded perspective view showing the electronic key according to a first embodiment of the present invention.

Referring to FIG. 2, the battery 9, the battery lid 7, and the cover 8 are coupled in this order to the case body 6. First, the battery 9 is arranged in the battery compartment 11. Then, the battery lid 7 is coupled to the case body 6. The two hooks 21 of the battery lid 7 are respectively aligned with the two catches 13 of the case body 6. This arranges the waterproof member 26 facing toward the step 12. In this state, the battery lid 7 is forced toward the case body 6. As a result, referring to FIG. 6, the guide surface 26b of the waterproof member 26 comes into contact with a distal surface of the receptacle 10, namely, the rim around the opening of the step 12. When forcing the battery lid 7 toward the case body 6, the guide surface 26b of the waterproof member 26 applies force that acts in an inward radial direction. The flexible groove 26a permits the waterproof member 26 to elastically deform in the inward radial direction. Thus, the waterproof member 26 deforms in the radially inward direction and becomes elastically compressed until the width W1 of the waterproof member 26 conforms to the width W2 of the step 12. The battery lid 7 is forced toward the case body 6 until the bottom surface of the battery lid 7 comes into contact with the distal surface of the receptacle 10. In this state, the ridge 26d of the waterproof member 26 is in close contact with the inner circumferential surface of the step 12. This seals the battery lid 7 and the step 12 in a liquid-tight state. When the bottom surface of the battery lid 7 comes into contact with the top surface of the receptacle 10, the hooks 21 engage with the catches 13. This engagement allows the user to recognize that the waterproof member 26 has become waterproof. The waterproof member 26 produces an elastic repulsive force and coherence resistance sufficient for holding the battery lid 7 on the receptacle 10. Thus, even when the hooks 21 are disengaged from the catches 13, the elastic repulsive force and coherence resistance of the waterproof member 26 hold the battery lid 7 on the receptacle 10.

Finally, the cover 8 is coupled to the case body 6. A catch (not shown) of the case body 6 is engaged with a hook (not shown) of the cover 8 to fix the cover 8 to the case body 6.

When replacing the battery 9 with a new one, the battery 9 is removed from the electronic key 2. In this case, the coupling procedures described above are reversed. First, the cover 8 and the battery lid 7 are removed from the case body 6. When the hooks 21 are disengaged from the catches 13, the elastic repulsive force of the waterproof member 26 keeps the battery lid 7 coupled to the case body 6.

Accordingly, after disengaging the hooks 21 from the catches 13, the user moves the battery lid 7 away from the case body 6. This removes the battery 9 from the case body 6 and opens the opening of the battery compartment 11 thereby allowing for the user to replace the battery 9 accommodated in the battery compartment 11 with a new one.

As described above in detail, the present embodiment has the advantages described below.

(1) When the battery lid 7 is coupled to the case body 6, the waterproof member 26 is elastically deformed inward in its radial direction and maintained in this state. That is, the waterproof member 26 is maintained in a state applying outward force to the inner circumferential surface of the annular step 26. In this manner, the waterproof member 26 seals the gap between the battery lid 7 and the step 12 (case body) in a liquid-tight state. This eliminates the need to fasten the battery lid 7 with a screw to the case body 6. Thus, there is no need for a fastening structure used to compress a waterproof member so that it becomes waterproof (2) When the battery lid 7 is coupled to the case body 6, the waterproof member 26 is deformed in the direction guided by the guide surface 26b. This deforms the waterproof member 26 inward in the radial direction and prevents deformation in other unintended directions. Further, the width W1 of the waterproof member 26 is decreased. In comparison to a structure that does not include the guide surface 26b, the waterproof member 26 subtly deforms in other unintended directions. This prevents the waterproof member 26 from interfering with the coupling of the battery lid 7 to the case body 6. Accordingly, the battery lid 7 is coupled to the case body 6 just by forcing the battery lid 7 toward the case body 6, and the waterproof member 26 seals the battery lid 7 and the case body 6 in a liquid-tight state. This eliminates the need for performing fastening with a screw.

(3) The flexible groove 26a extends throughout the entire annular waterproof member 26. Further, the flexible groove 26a opens in a direction perpendicular to the radial direction of the waterproof member 26. The flexible groove 26a facilitates deformation of the waterproof member 26 in the radial direction. The flexible groove 26a has a simple structure. This facilitates the production of a mold used to integrally mold the waterproof member 26 and the battery lid 7.

(4) When integrally molding the waterproof member 26 and the battery lid 7, silicone rubber, which forms the waterproof member 26, enters the design grooves 23 through the communication grooves 24, which are located near the waterproof member holder 22. By filling the design grooves 23 with silicone rubber, the illustration formed by the design grooves 23 is emphasized by the color of the silicone rubber. In other words, the strong color contrast between the silicone rubber and the battery lid 7 allows for the user to easily recognize the illustration. Further, the silicone rubber entering the design grooves 23 is solidified in a state slightly protruding from the design grooves 23. Thus, the silicone rubber functions to prevent slipping when the user holds the battery lid 7 in addition to functioning as a stimulus to the user when touched.

(5) The waterproof member 26 is elastic. Thus, even when the waterproof member 26 surrounds the opening of the battery compartment 11 and functions to be waterproof, it may be difficult for the user to determine whether or not the waterproof member 26 is functioning to be waterproof. Accordingly, in the present embodiment, the catches 13 are engaged with the hooks 21 when the waterproof member 26 seals the battery lid 7 and the step 12 in a liquid-tight state. This allows for the user to determine that the waterproof member 26 is in a waterproof state.

(6) The elastic repulsive force of the waterproof member 26 maintains the battery lid 7 in a state coupled to the case body 6. In this state, the waterproof member 26 seals the battery lid 7 and the case body 6 in a liquid-tight state. Thus, in the present embodiment, there is no need to fasten the battery lid 7 to the case body 6 with a screw. Since a structure for fastening with a screw can be eliminated, the structure of the electronic key 2 is simplified. This allows for reduction in the size of the case body 6 (electronic key 2).

An electronic key according to a second embodiment of the present invention will now be described with reference to FIGS. 7 and 8. The present invention differs from the first embodiment mainly in the structure of the waterproof member. Like or same reference numerals are given to those components that are the same as the corresponding components of the first embodiment. Such components will not be described.

Figure 7:
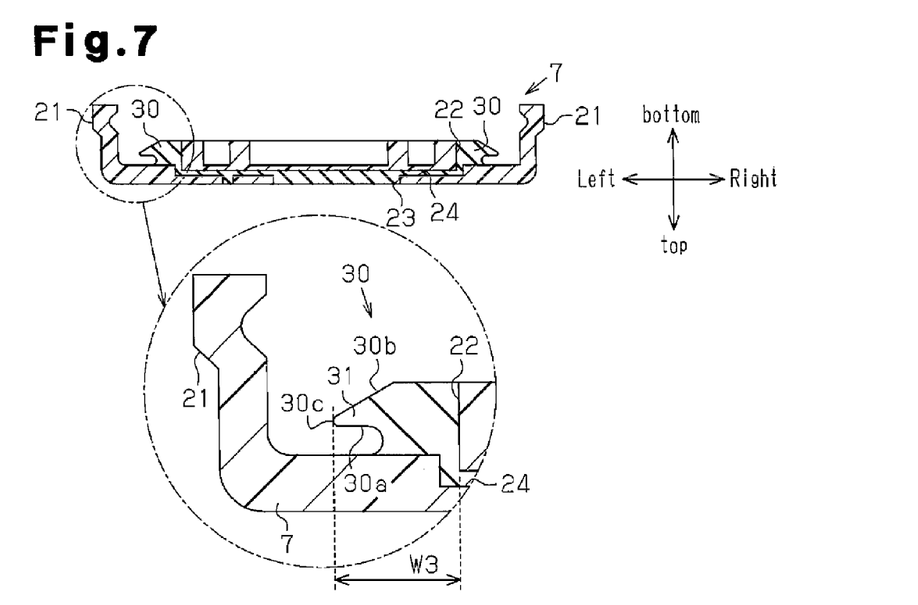
FIGS. 7 and 8 are cross-sectional views showing a battery lid according to a second embodiment of the present invention and respectively corresponding to FIGS. 5 and 6.
Figure 8:
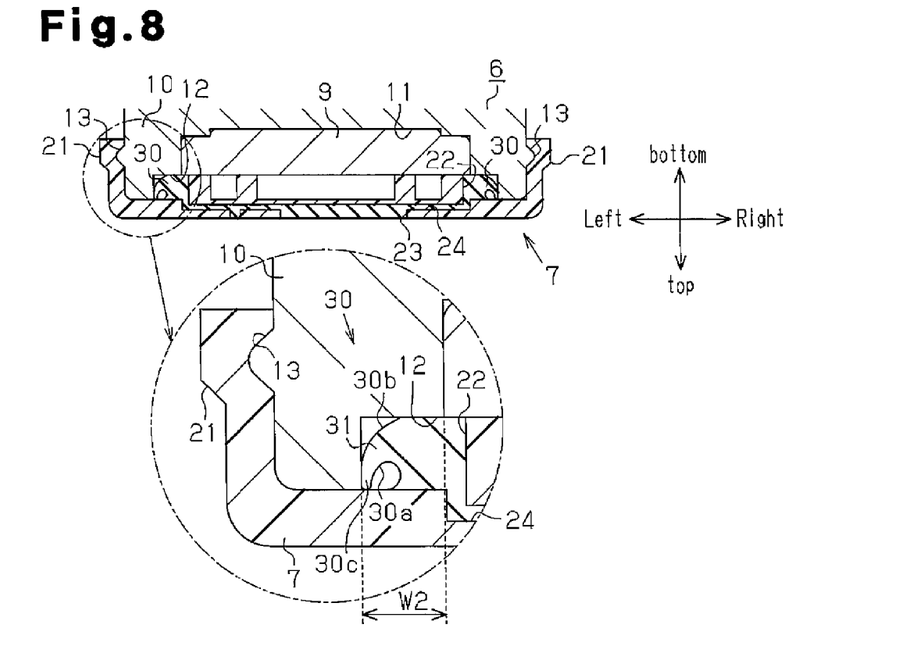

Referring to FIG. 7, an annular waterproof member 30 is insert-molded in the battery lid 7. A flexible groove 30a extends along the entire outer circumferential surface of the waterproof member 30. Accordingly, the flexible groove 30a opens outward in the radial direction. Further, the waterproof member 30 includes a guide surface 30b inclined gradually outward in the radial direction toward the top surface of the battery lid 7. The waterproof member 30 includes a projection 31, which serves as a flexible portion and is formed by the flexible groove 30a and the guide surface 30b. The projection 31 includes a ridge 30c extending along the entire outer circumferential surface of the waterproof member 30. The flexible groove 30a allows for the projection 31 of the waterproof member 30 to be easily deformed. When external force applied to the guide surface 30b acts on the waterproof member 30, the projection 31 is elastically bent into the flexible groove 30a. The waterproof member 30 has a width W3, which is the distance from the outer circumferential surface of the waterproof member holder 22 to the ridge 30c of the projection. The width W3 is greater than the width W2 of the step 12.

The procedures for coupling the battery lid 7 to the case body 6 will now be described.

In the same manner as the first embodiment, the battery lid 7 is coupled to the case body 6. Referring to FIG. 8, the projection 31 (guide surface 30b) comes into contact with the distal surface of the receptacle 10, namely, the rim around the opening of the step 12. From this state, the battery lid 7 is forced toward the case body 6. The rim around the opening of the step 12 pushes the projection 31 toward the inner bottom surface of the battery lid 7. The projection 31 is elastically bent into the flexible groove 30a until the width W3 of the waterproof member 30 conforms to the width W2 of the step 12. When the battery lid 7 is coupled to the case body 6, the ridge 30c of the waterproof member 30 coheres to the inner circumferential surface of the step 12. The waterproof member 30 produces an elastic repulsive force that presses the inner wall surface of the step 12 with the projection 31 outward in the radial direction. This seals the battery lid 7 and the step 12 in a liquid-tight state. The waterproof performance of the waterproof member 30 varies in accordance with the area of contact between the projection 31 and the inner wall surface of the step 12. To increase the waterproof capacity, the projection 31 need only be elongated in the radial direction. This would increase the area of contact between the projection 31 and the inner wall surface of the step 12 when the waterproof member 30 is accommodated in the step 12 and thereby increase the waterproof capacity.

In addition to advantages (1), (2), and (4) to (6) of the first embodiment, the present embodiment has the following advantage.

(7) The waterproof capacity required in accordance with the application of the portable device is easily obtained by just changing the projection length of the projection 31.

It should be apparent to those skilled in the art that the present invention may be embodied in many other specific forms without departing from the spirit or scope of the invention. Particularly, it should be understood that the present invention may be embodied in the following forms.

Figure 11:
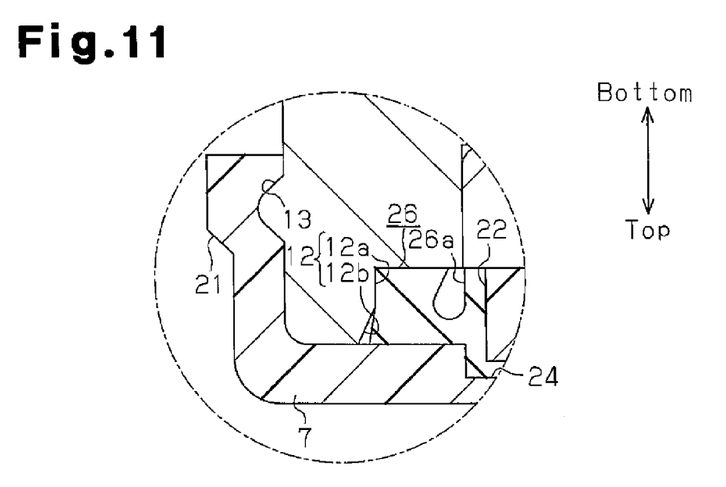
FIG. 11 is a cross-sectional view of the electronic key of FIG. 9 corresponding to FIG. 6.

In the first embodiment, the guide surface 26b may be eliminated. This would still allow for the attachment of the battery lid 7 to the case body 6 and ensure liquid-tight sealing. Further, when eliminating the guide surface 26b, a guide surface may be formed on the step 12. More specifically, as shown in FIG. 11, a guide surface 12b may be formed throughout an inner circumferential surface 12a of the step 12 at the open end of the step 12. The guide surface 12b is inclined to that its diameter is enlarged as the open end of the step 12 becomes closer. By forming the step 12 in this manner, when attaching the battery lid 7 to the case body 6, an outer end of the waterproof member 26 comes into contact with the guide surface 12b. As the battery lid 7 is further pushed into the case body 6, the guide surface 12b forces the waterproof member 26 inward in the radial direction. As a result, due to the flexible groove 26a, the waterproof member 26 is elastically deformed inward in the radial direction. Then, after the end of the waterproof member 26 passes by the guide surface 12b, the waterproof member 26 produces an elastic repulsive force that pushes the inner circumferential surface 12a of the step 12 outward in the radial direction. This seals the battery lid 7 and the case body 6 in a liquid-tight state.

In this manner, when eliminating the guide surface 26b, it is desirable that a structure be provided to aid elastic deformation of the waterproof member 26 in an optimal sealing direction during coupling of the battery lid 7 to the case body 6. The second structure may also use a similar structure.

Figure 9A:
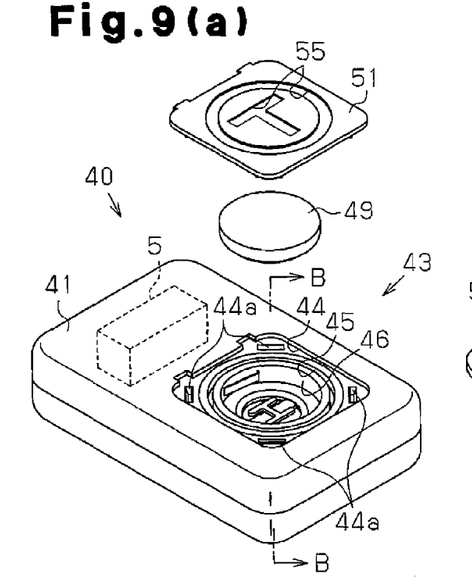
FIG. 9(a) is an exploded perspective view showing an electronic key according to a modified example of the present invention.

In each of the above embodiments, the battery lid 7 may also function as a cover that forms an ornamental surface of the electronic key 2. This would integrate the battery lid 7 and cover and allow for the electronic key 2 to be entirely miniaturized. More specifically, as shown in FIG. 9(a), an electronic key 40 includes a case body 41, which accommodates an electronic component 5, and a battery lid 51, which is coupled to the case body 41 and which forms an ornamental surface of the electronic key 40. The case body 41 includes a battery lid holder 44, which is adjacent to the electronic component 5. A battery lid 51, which has the shape of a tetragonal battery plate, is arranged on the battery lid holder 44. An annular groove 45 is formed in an inner bottom surface of the battery lid holder 44. A battery compartment 46 is formed inward from the annular groove 45 to accommodate a button cell, or battery 49. The battery lid holder 44 includes four corners, each provided with a catch 44a that engages with the battery lid 51.

Figure 9B:
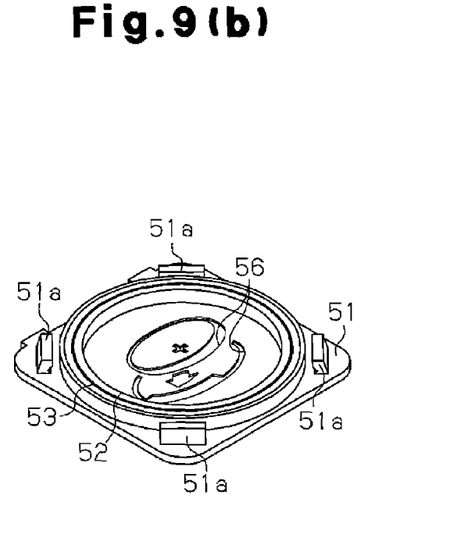
FIG. 9(b) is a perspective view showing a bottom surface of the battery lid of FIG. 9(a)

As shown in FIG. 9(b), an annular waterproof member holder 52 is formed on the bottom surface of the battery lid 51. In the same manner as the first embodiment, an annular waterproof member 53 is insert-molded to an outer circumferential surface of the waterproof member holder 52. The distance from an inner surface of the waterproof member holder 52 to a ridge at an outer side of the waterproof member 53 is set to be greater than the width of the annular groove 45. Hooks 51a are formed on the four corners in the bottom surface of the battery lid 51. The hooks 51a correspond to the catches 44a.

The battery lid 51 is forced toward the case body 41 and attached to the battery lid holder 44. The waterproof member holder 52 and the waterproof member 53 are inserted into the annular groove 45. Since the total widths of the waterproof member holder 52 and the waterproof member 53 is set to be greater than the width of the annular groove 45, the distal surface of the annular groove 45 contacts the waterproof member 53. When further forcing the battery lid 51 into the case body 41 in this state, the waterproof member 53 is elastically deformed inward in the radial direction in the same manner as the first embodiment. Further, the waterproof member holder 52 and the waterproof member 53 are accommodated in the annular groove 45. In this manner, when the battery lid 51 is coupled to the case body 41, the elastically deformed waterproof member 53 presses the inner wall surface of the annular groove 45 outward in the radial direction. This seals the battery lid 51 and the annular groove 45 in a liquid-tight state. In this state, the hooks 51a are engaged with the catches 44a. This allows for the user to recognize that the waterproof member 26 has become waterproof. Here, the waterproof member 30 of the second embodiment may be arranged in the waterproof member holder 52.

Figure 10:
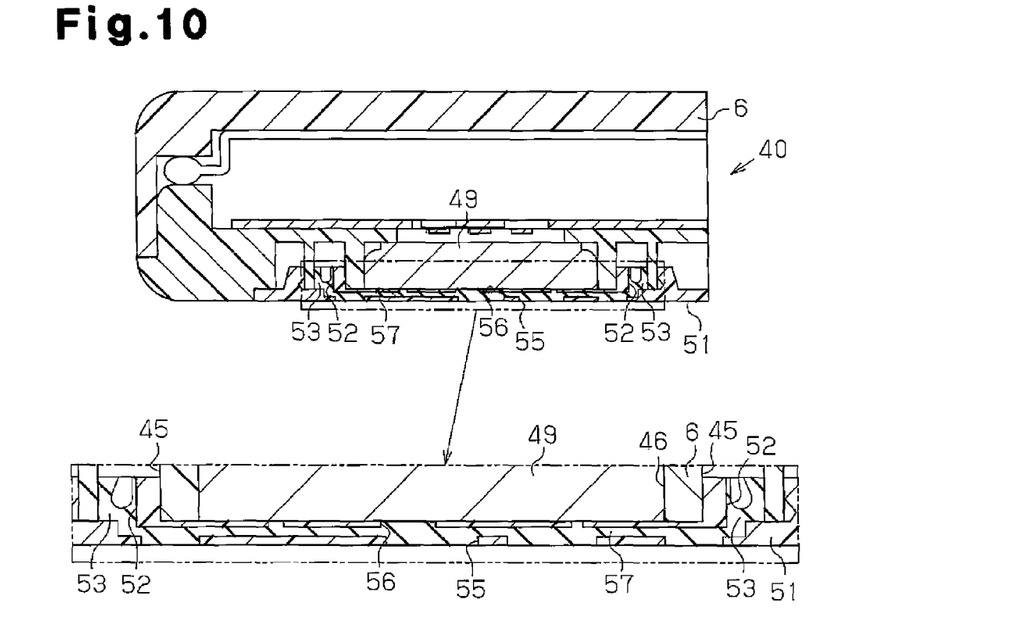
FIG. 10 is a cross-sectional view of the electronic key taken along line B-B in FIG. 9.

In each of the above embodiments, design grooves may be formed in the bottom surface of the battery lid in addition to the top surface and be joined with the location at which the waterproof member is formed. More specifically, as shown in FIGS. 9(a) and 9(b), a battery lid 51 includes design grooves 55, which are formed in the top surface, and design grooves 56, which are formed in the bottom surface. As shown in FIG. 10, the design grooves 55 and 56 are in communication with the location at which a waterproof member 53 is formed in the bottom surface of the battery lid 51 through communication grooves 57.

When the waterproof member 53, which is formed from silicone rubber, is insert-molded, the silicone rubber enters the design grooves 55 and 56 through the communication grooves 57. The silicone rubber solidifies in a state protruding from the design grooves 55 and 56 in the top and bottom surfaces of the battery lid 51. Accordingly, the silicone rubber functions to prevent slipping when the user holds the battery lid 51. The illustrations formed by the design grooves 55 and 56 are emphasized by the contrast between the red silicone rubber and the battery lid 51.

In each of the above embodiments, the waterproof member 26 (30) does not have to be round and may be, for example, tetragonal. It is only required that the waterproof member 26 (30) have an enclosed shape.

In each of the above embodiments, silicone rubber does not have to be arranged in the design grooves 23. In other words, the communication grooves 24 do not necessarily have to be formed. Further, the design grooves 23 do not necessarily have to be formed.

In each of the above embodiments, the catches 13 (44a) and the hooks 21 (51a) do not necessarily have to be formed.

In each of the above embodiments, the positional relation of the catches and hooks may be reversed. That is, the catches 13 (44a) may be formed in the battery lid 7, and the hooks 21 (51a) may be formed in the case body.

In each of the above embodiments, the battery lid 7 and the waterproof member 26 need only be formed integrally. More specifically, insert-molding does not necessarily have to be performed. For example, two-color molding may be performed.

In each of the above embodiments, the silicone rubber does not have to be colored red and may be in another color. It is only required that the silicone rubber be colored differently from the battery lid 7 (51). In the same manner, the color of the battery lid 7 is also not limited to black.

In each of the above embodiments, the step 12 may be eliminated.

In each of the above embodiments, the waterproof member 26 does not have to be formed from silicone rubber and may be formed from any material that is elastic under normal temperatures and prevents the permeation of liquid.

The present examples and embodiments are to be considered as illustrative and not restrictive, and the invention is not to be limited to the details given herein, but may be modified within the scope and equivalence of the appended claims.

The invention claimed is:

1. A portable device for use with a communication peer, the portable device comprising:
    an electronic component that performs predetermined wireless communication with the communication peer;
    a battery that powers the electronic component; and
    a case that accommodates the electronic component and the battery, wherein the case includes:
        a case body including a battery compartment that accommodates the battery, wherein the battery compartment includes an opening formed in one side of the case body;
        a battery lid that covers the opening of the battery compartment; and
        an elastic waterproof seal formed integrally with the battery lid and surrounding the opening of the battery compartment, wherein the battery lid is coupled to the case body in a direction perpendicular to a radial direction of the waterproof seal;
        a rim formed around the opening of the battery compartment pushes the waterproof seal and elastically deforms the waterproof seal in an inward radial direction when the battery lid is coupled to the case body; and
    the waterproof seal produces an elastic repulsive force when elastically deformed in the inward radial direction, and the elastic repulsive force pushes against an inner wall of the battery compartment in an outward radial direction to keep the battery lid in a state coupled to the case body and to seal a gap between the battery lid and the case body in a liquid-tight state,
    wherein the waterproof seal includes a flexible groove that extends entirely along the waterproof seal and opens in a direction perpendicular to the radial direction.

2. The portable device according to claim 1, wherein the waterproof seal includes a guide portion that first contacts the rim formed around the opening of the battery compartment when coupling the battery lid to the case body, and the guide portion guides the elastic deformation of the waterproof seal in the inward radial direction of the waterproof seal when pushed by the rim formed around the opening of the battery compartment.

3. The portable device according to claim 1, wherein the battery lid includes:
    a holder that holds the waterproof seal, wherein the holder is formed in a bottom surface of the battery lid;
    a design groove formed in a top surface of the battery lid; and
    a communication groove that communicates the design groove and the waterproof seal, wherein the communication groove is formed in the battery lid;
wherein the waterproof seal and the battery lid are formed from materials of different colors.

4. The portable device according to claim 3, further comprising a resin portion filling the communication groove and the design groove, wherein the resin portion forms part of the waterproof seal.

5. The portable device according to claim 1, wherein:
    the battery lid includes a bottom surface and a holder that projects from the bottom surface to hold the waterproof seal;
    the waterproof seal is fitted on an peripheral outer surface of the holder; and
    the waterproof seal has the same height as the holder when the battery lid is coupled to the case body.

6. The portable device according to claim 5, wherein the rim of the battery compartment compresses the waterproof seal in the inward radial direction.

7. The portable device according to claim 6, wherein the waterproof seal is a loop-shaped portion of a rubber member partially embedded in the battery lid.

8. The portable device according to claim 6, wherein the waterproof seal produces the elastic repulsive force in the inward radial direction but does not produce an elastic repulsive force in the direction perpendicular to a radial direction of the waterproof seal when the battery lid is coupled to the case body.

9. The portable device according to claim 5, wherein
    the battery lid is formed from a relatively hard resin material, and
    the waterproof seal is formed from a relatively soft resin material that produces elastic repulsive force to hold the battery lid on the case body.

10. The portable device according to claim 9, wherein the waterproof seal is an insert-molded product that is insert-molded to the battery lid.

11. A portable device for use with a communication peer, the portable device comprising:
    an electronic component that performs predetermined wireless communication with the communication peer;
    a battery that powers the electronic component; and
    a case that accommodates the electronic component and the battery, wherein the case includes:
        a case body including a battery compartment that accommodates the battery, wherein the battery compartment includes an opening formed in one side of the case body;
        a battery lid that covers the opening of the battery compartment; and
        an elastic waterproof seal formed integrally with the battery lid and surrounding the opening of the battery compartment, wherein
        the battery lid is coupled to the case body in a direction perpendicular to a radial direction of the waterproof seal;
        a rim formed around the opening of the battery compartment pushes the waterproof seal and elastically deforms the waterproof seal in an inward radial direction when the battery lid is coupled to the case body; and
        the waterproof seal produces an elastic repulsive force when elastically deformed in the inward radial direction, and the elastic repulsive force pushes against an inner wall of the battery compartment in an outward radial direction to keep the battery lid in a state coupled to the case body and to seal a gap between the battery lid and the case body in a liquid-tight state,
    wherein the waterproof seal includes a flexible portion projecting in an outward radial direction entirely from an outer surface of the waterproof seal, and the flexible portion bends along the inner wall of the battery compartment when the battery lid is fitted to the case body.

12. A portable device for use with a communication peer, the portable device comprising:
   an electronic component that performs predetermined wireless communication with the communication peer;
   a battery that powers the electronic component; and
   a case that accommodates the electronic component and the battery, wherein the case includes:
      a case body including a battery compartment that accommodates the battery, wherein the battery compartment includes an opening formed in one side of the case body;
      a battery lid that covers the opening of the battery compartment; and
      an elastic waterproof seal formed integrally with the battery lid and surrounding the opening of the battery compartment, wherein
      the battery lid is coupled to the case body in a direction perpendicular to a radial direction of the waterproof seal;
      a rim formed around the opening of the battery compartment pushes the waterproof seal and elastically deforms the waterproof seal in an inward radial direction when the battery lid is coupled to the case body; and
      the waterproof seal produces an elastic repulsive force when elastically deformed in the inward radial direction, and the elastic repulsive force pushes against an inner wall of the battery compartment in an outward radial direction to keep the battery lid in a state coupled to the case body and to seal a gap between the battery lid and the case body in a liquid-tight state,
   further comprising:
      a catch formed on one of the battery lid and the case body; and
   a hook formed on the other of the battery lid and the case body, wherein the hook engages the catch when the battery lid is coupled to the case body, and the hook remains disengaged from the catch until the battery lid is coupled to the case body.

* * * * *